United States Patent [19]

Sakuma

[11] Patent Number: 5,878,202
[45] Date of Patent: Mar. 2, 1999

[54] I/O DEVICE HAVING CHECK RECOVERY FUNCTION

[75] Inventor: Takeshi Sakuma, Tokyo, Japan

[73] Assignee: Kabushiki Kaisha Toshiba, Japan

[21] Appl. No.: 723,838

[22] Filed: Sep. 30, 1996

[30]    Foreign Application Priority Data

Jan. 31, 1996  [JP]  Japan ................................ 8-015663

[51] Int. Cl.⁶ ........................... G06F 11/10; G06F 11/00; G11B 20/18
[52] U.S. Cl. .................... 395/182.04; 395/823; 395/569
[58] Field of Search ............................. 395/182.04, 823, 395/569; 364/481; 369/44.32, 44.33

[56]           References Cited

U.S. PATENT DOCUMENTS

| 5,191,584 | 3/1993 | Anderson | 395/182.04 |
| 5,379,417 | 1/1995 | Lui et al. | 364/481 |
| 5,463,765 | 10/1995 | Kakuta et al. | 395/182.04 |
| 5,734,814 | 3/1998 | Corbin et al. | 395/182.04 |

FOREIGN PATENT DOCUMENTS

| 0 026 980 | 4/1981 | European Pat. Off. . |
| 0 572 019 | 12/1993 | European Pat. Off. . |
| 7-6099 | 1/1995 | Japan . |
| WO94/29807 | 12/1994 | WIPO . |

OTHER PUBLICATIONS

B. Srinivasan et al., "Recoverable file system for microprocessor system for microprocessor systems, " vol. 9, No. 4 (May 1985) , pp. 179–183.

*Primary Examiner*—Parshotam S. Lall
*Assistant Examiner*—Philip B. Tran
*Attorney, Agent, or Firm*—Finnegan, Henderson, Garabow, Garrett & Dunner, L.L.P.

[57]              ABSTRACT

When a data write request is received from an application program, the received data write request is issued to a disk (primary) without waiting next check point, and the data write request is issued to a disk (shadow) after obtaining next check point. When restarting a process from obtained preceding check point, data in the disk (primary) is recovered by data in the disk (shadow). As a result, a delay of I/O request by a check point is decreased, thereby remarkably improving system performance in a normal operation.

6 Claims, 8 Drawing Sheets

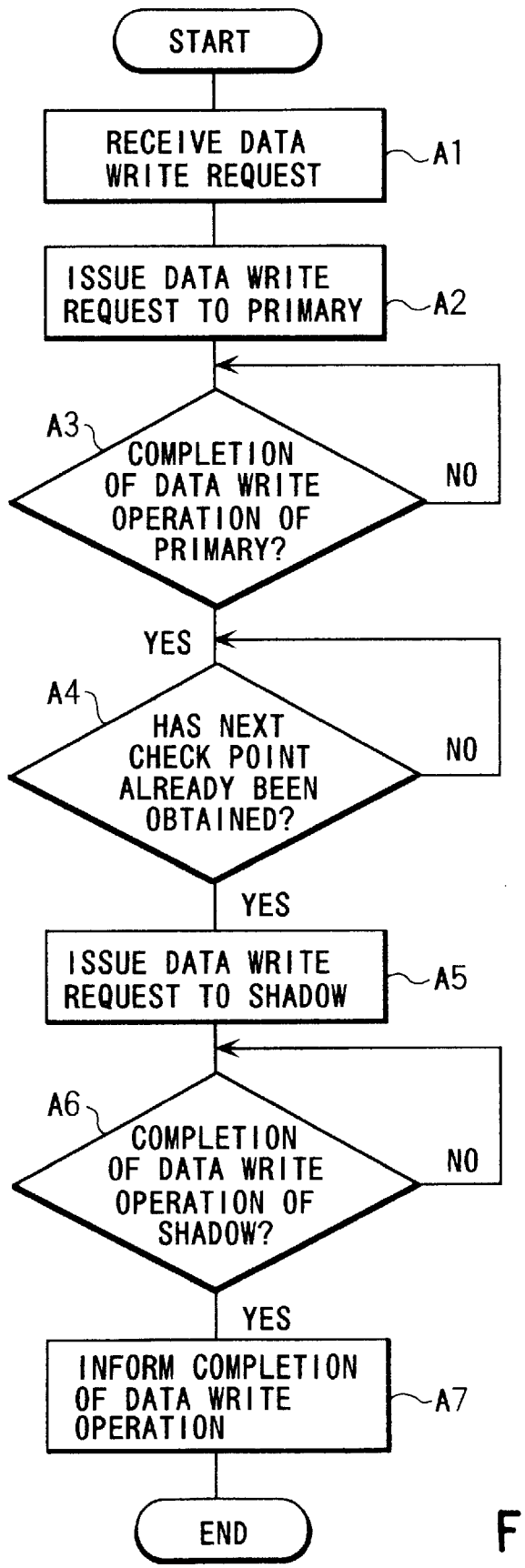
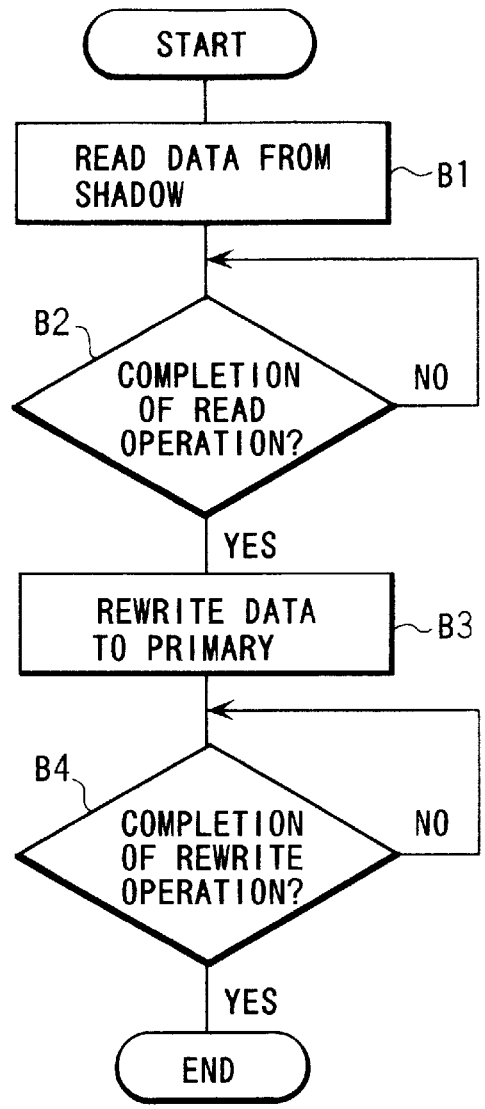
F I G. 5 B
F I G. 5 A

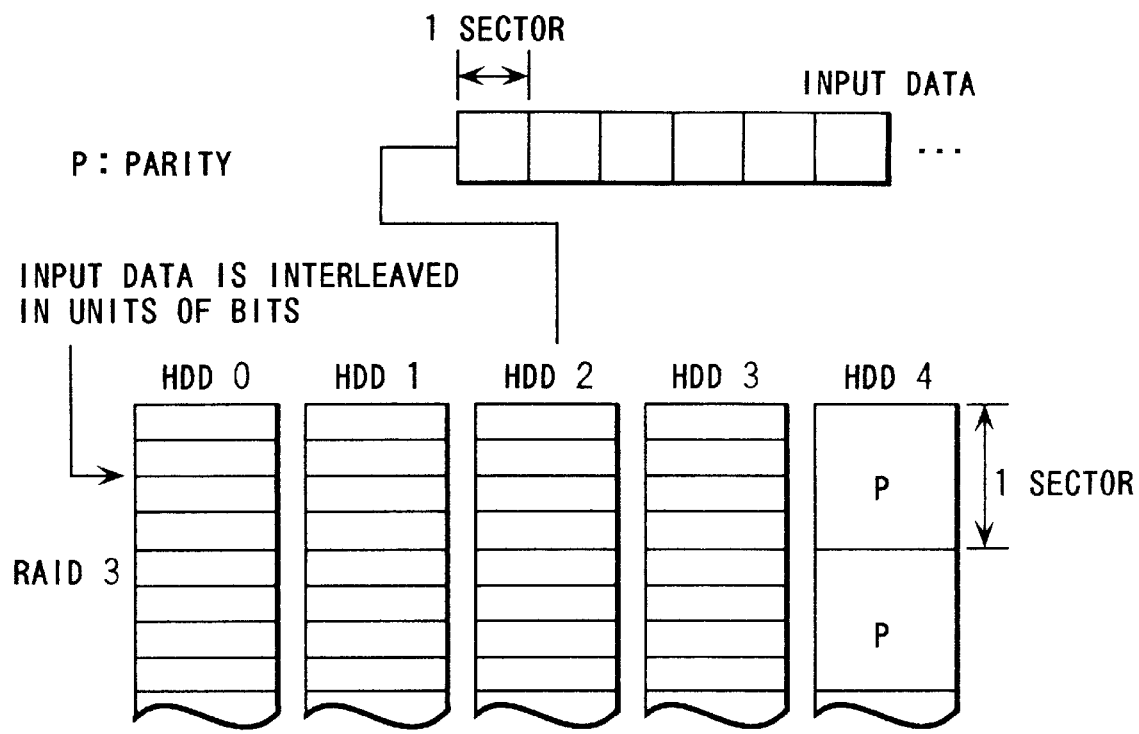
F I G. 9A
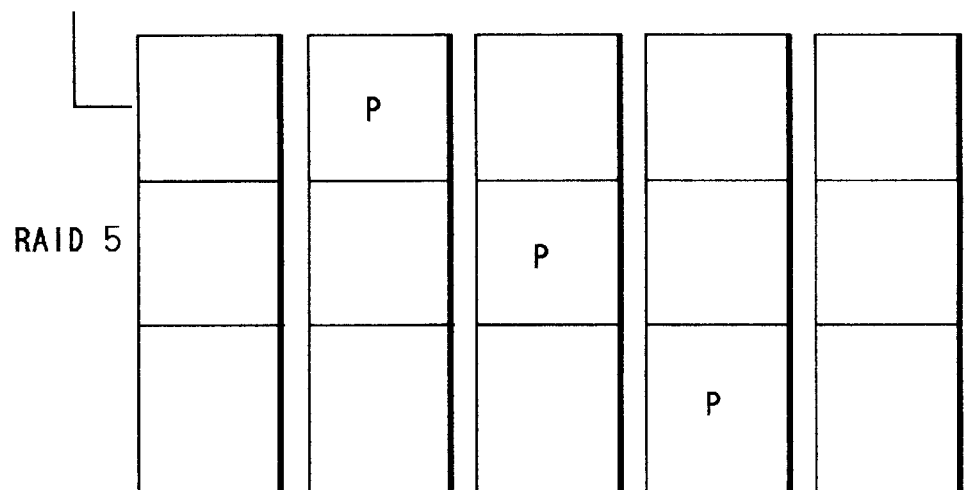
F I G. 9B 5,878,202

I/O DEVICE HAVING CHECK RECOVERY FUNCTION

BACKGROUND OF THE INVENTION

1. Field of the Invention

The present invention relates to an I/O control method and an article of manufacture which are suitable for an application to a computer system having a check point restart function, more specifically, an I/O control method for remarkably improving I/O process in the computer system without waiting all I/O processes in the case of multiplexing a secondary storage unit until obtaining next check point.

2. Description of the Related Art

Recently, a computer system has been remarkably in common use, and thus higher reliability is demanded. In order to improve the reliability of the computer system, a check point restart system exists.

Conventionally, in a computer system having a check point restart system for performing a process while obtaining check points periodically and when a fault in a system occurs, restarting the process from an obtained check point so as to recover a fault, in order to obtain consistency of a memory state and a restarting state of a process with a state of an I/O unit (for example, contents of a disk), it is necessary to execute only a fixed I/O request which is surely issued even after the recovery. For this reason, in general, even if the I/O request is issued, this execution (process) is reserved until a next check point process is started, and the I/O request is executed after the completion of the check point process collectively.

In such a conventional I/O control method, apart from a read operation in which read log is not left when the memory state is recovered, but at least issuance of writing is delayed for a time from the original issuance to obtaining of a check point.

Meanwhile, in the computer system having such a fault tolerant characteristic, a disk is generally multiplexed so that its reliability is improved. In this case, in order to obtain reliability of data, it is necessary to perform I/O request issuance on each multiplexed disk sequentially, not concurrently. The principle of an operations at this time is explained with reference to FIG. 1.

Here, files are managed by a multiplexing method, namely, primary files and shadow files are managed separately. These files may be multiplexed on different disks, or they may be multiplexed in logical partitions of one disk.

If a writing request is issued from an application program ((1) in FIG. 1), a file management system issues an instruction to a device driver so as to write this request to a primary file ((2) in FIG. 1). When the writing completion is informed by the device driver ((3) in FIG. 1), the file management system issues an instruction for writing to a shadow file ((4) in FIG. 1).

When the completion of the writing to the shadow file is informed ((5)in FIG. 1), the file management system informs of the completion of writing to the application program ((6) in FIG. 1).

Therefore, as to the request to write in the system to which the check point mechanism mentioned above is applied and where the file is multiplexed, the issuance waits until the check point, and one logical I/O request is not completed as long as the writing to both the multiplexed files is not completed. For this reason, the whole processing times becomes longer. The operating principle at this time is described with reference to FIG. 2.

For example, if the request to write is issued from the application program ((1) in FIG. 2), the file management system waits for the issuance of this request until next check point is obtained ((2) in FIG. 2). Then, when a check point is obtained ((3) in FIG. 2), the file management system issues an instruction to the device driver so as to write the waiting request to a primary file ((4) in FIG. 2).

The process hereinafter is the same as the process shown in FIG. 1, namely, when the completion of writing is informed from the device driver ((5) in FIG. 2), the file management system issues an instruction to the device driver so as to write to a shadow file ((6) in FIG. 2). When the completion of writing to the shadow file is informed ((7) in FIG. 2), the completion of writing is informed to the application program ((8) in FIG. 2).

In other words, as to the request to write to the secondary storage unit, since the processing time becomes longer by a period shown in (2) of FIG. 2, the response time to the whole system becomes longer.

Japanese Patent Application No. 5-305077/1993 (U.S. Ser. No. 992,219, Date of Application: Dec. 17, 1992, Assignee: IBM) discloses a system for multiplexing remote data and its method. This system is a multiplexing system of DASD, and a secondary side is in a remote position. Input data are directly written to a primary disk, and data are grouped per sequential check point so as to be written to the secondary side. However, the check points in this system corresponds to sequential check point which are processed as a sequential unit after a series of information packets collected as a group, so these check points are different from the check points for recovering the system described in the present invention. In other words, the check points in the system of IBM are used for multiplexing data (in order to obtain matching of sequence of packets transmitted in asynchronous). On the contrary, the check points in the present embodiment are used for matching data in the computer system adopting the check point recovery system. Since the system of IBM does not adopt the check point restarting system, time intervals of check points are longer than the present invention.

SUMMARY OF THE INVENTION

It is an object of the present invention to provide an I/O control method and an article of manufacture for remarkably improving I/O processing ability in a computer system without waiting all the I/O processes until next check point is obtained when a secondary storage unit is multiplexed.

An I/O control method of the present invention which is applied to a computer system for multiplexing and managing single data in a plurality of locations, the computer system comprising check point obtaining means for periodically obtaining check points for restarting an interrupted process when the process is interrupted, the I/O control method is characterized by having the computer steps of the first step of determining a plurality of locations in a secondary storage unit as writing locations for the data when a request to write the data to the secondary storage unit is received, the second step of issuing the received request to write the data to at least one or more locations in the determined plurality of locations in the secondary storage unit without waiting next check point, the third step of executing the data write process to the locations other than the locations where the writing of data has been issued in the second step after next check point is obtained, and the fourth step of recovering the locations where the data have been written in the second step by the data in the other locations when the process is restarting from the obtained preceding check point.

In this invention, when the data write request is received, for example, the data write process is executed to the primary file among files multiplexed into primary and shadow files without waiting next check point. Meanwhile, the data write process is executed to the shadow file after the completion of the data write process to the primary file and next check point is obtained.

In general, since the intervals of obtaining check points are enough small compared to a time required for processing the writing to the primary file, in most cases, next check point is obtained during the process for writing to the primary file. Therefore, when the writing is executed to the shadow file, a period of waiting is hardly required, thereby reducing the processing time greatly.

Here, the case of restarting the process which is interrupted due to a defect, etc. from preceding check point is considered.

In this case, in this invention, when the data written to the primary file is recovered by the data in the shadow file, any mismatching does not occur. As a result, it can be avoided that all the I/O processes in the case of multiplexing the secondary storage unit are waited until next check point is obtained, thereby remarkably improving the processing ability.

In addition, an I/O control method which is applied to a computer system for composing a parity group and managing single data in a plurality of secondary storage units, the computer system comprising check point obtaining means for periodically obtaining check points for restarting an interrupted process when the process is interrupted, the I/O control method is characterized by having the computer steps of the first step of computing a parity after renewal when a request to write data to the secondary storage units is received, the second step of executing the request to write data to the secondary storage units without waiting next check point, the third step of executing the write process of the parity calculated in the first step after obtaining next check point, and the fourth step of recovering the data written in the second step by data computed from the parity when restarting the process from the obtained preceding check point.

In this invention, when the data write request is received, the data write process is executed without waiting next check point, but the write process of the parity to be renewed is executed after the write process is completed and next check point is obtained.

In this case, since the intervals of obtaining check points are enough small compared to a time required for writing to the file, in most cases next check point is obtained during the process of writing to the file. Therefore, when the parity is written, the waiting period is not required, thereby decreasing the processing time greatly.

Here, the case of restarting the process which is interrupted due to a defect, etc. from preceding check point is considered.

In this case, in the present invention, since the data written to the file are recovered by the parity, any mismatching does not occur. As a result, it can be avoided that the I/O process is waited until next check point is obtained, thereby improving the processing ability rapidly.

In addition, an I/O control method which is applied to a computer system for composing a parity group and managing information in a plurality of secondary storage units, the computer system comprising check point obtaining means for periodically obtaining check points for restarting an interrupted process when the process is interrupted, the I/O control method is characterized by having the computer steps of the first step of computing a parity after renewal when a data write request to the secondary storage units is received, the second step of executing the write process of the parity computed in the first step without waiting next check point, the third step of executing the data write process to the secondary storage units after obtaining next check point, and the fourth step of recovering the parity written in the second step by a parity computed from the data in the secondary storage units when restarting the process from the obtained preceding check point.

In this invention, when the data write request is received, the data write process is executed with respect to the parity to be renewed due to a result of the data write operation without waiting next check point, and the data write process is executed after the write process of parity is completed, and next check point is obtained.

In this case, since the intervals of obtaining check points are enough small compared to a time required for the process of writing the parity, in most cases, next check point is obtained during the process of writing the parity. Therefore, when the data are written, the waiting period is not required, thereby decreasing the processing time greatly.

Here, the case of restarting the process which is interrupted due to a defect, etc. from preceding check point is considered.

In this case, in this invention, since the parity is recovered by the data in the file, any mismatching does not occur. As a result, it can be avoided that the I/O process is waited until next check point is obtained, thereby improving the processing ability remarkably.

As mentioned above, according to the present invention, in the computer system having the check point restarting function which obtains reliability of data by managing single data in a plurality of location, a delay of I/O request issuance due to a check point can be reduced, and it is possible to remarkably improve the system performance in the normal operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 5A and 5B are flow charts explaining an operating procedure of the computer system according to first embodiment.

FIGS. 9A and 9B are conceptual diagrams explaining level 3 and level 5 of RAID.

DETAILED DESCRIPTION OF THE PREFERRED EMBODIMENTS

The following describes embodiment of the present invention with reference to the drawings.

FIRST EMBODIMENT

Figure 1:
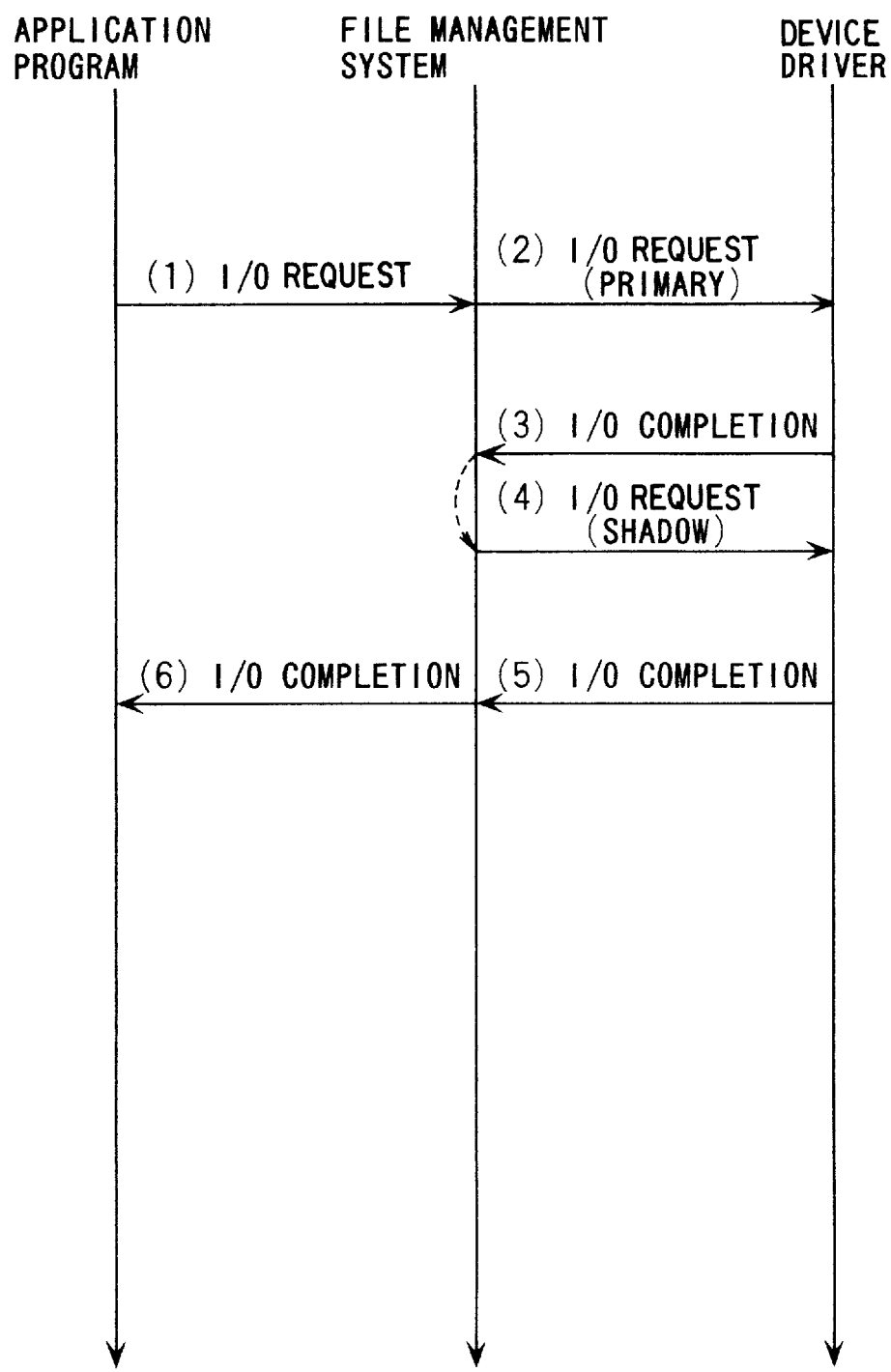
FIG. 1 is a view for explaining an operation for issuing I/O in a conventional computer system.
Figure 2:
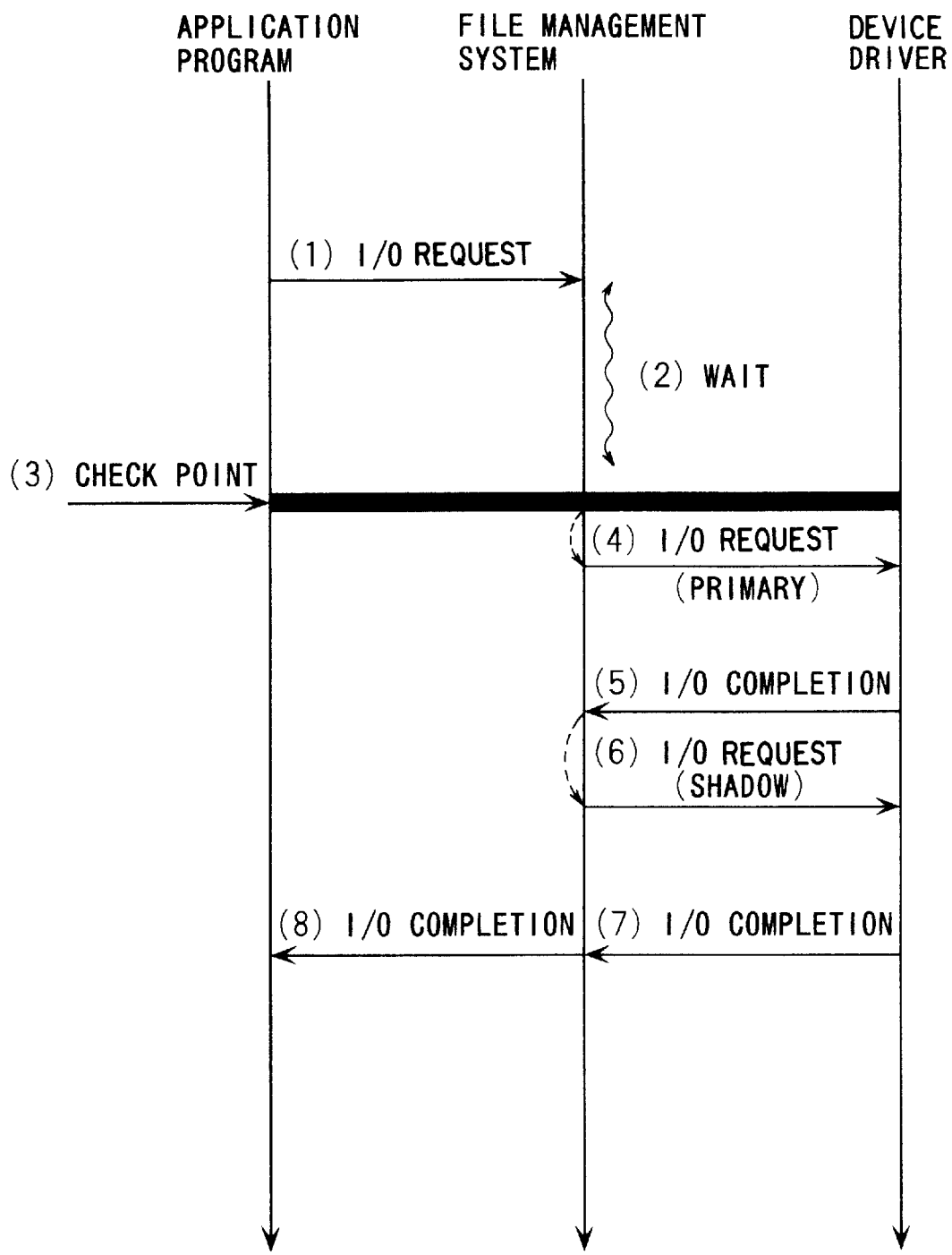
FIG. 2 is a view for explaining an operation for issuing I/O in a conventional computer system.
Figure 3:
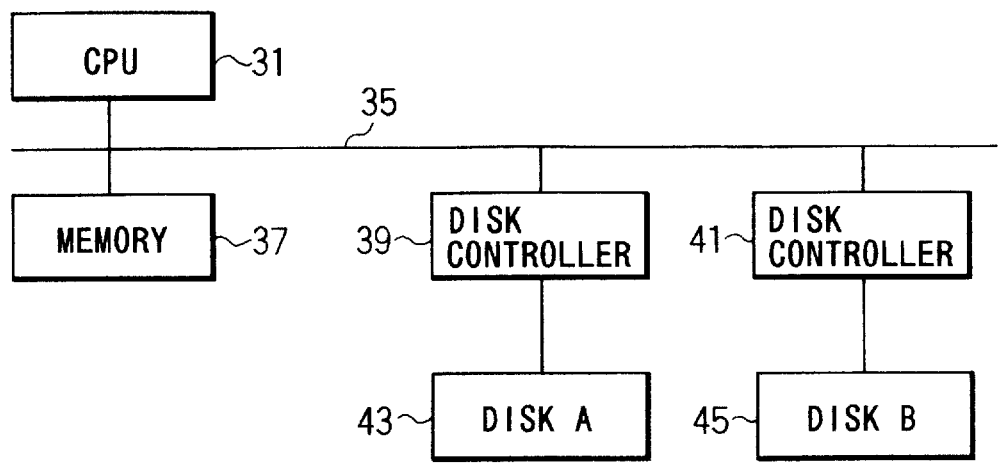
FIG. 3 is a block diagram showing one example of the computer system according to first embodiment of the present invention.

FIG. 3 is a block diagram showing one example of a computer system according to first embodiment of the present invention. As shown in FIG. 3, the computer system is composed of a CPU 31, a memory 37, disk drives 43 and 45, disk controllers 39 and 41 for controlling the disk drives, and a system bus 35 for connecting the above units. Programs shown in FIGS. 5A, 5B, 5A, 5B, 7A, 7B, 8A and 8B are stored in the memory 37. In FIG. 3, the number of the CPU is one, but a plurality of CPUs may be used.

Figure 4:
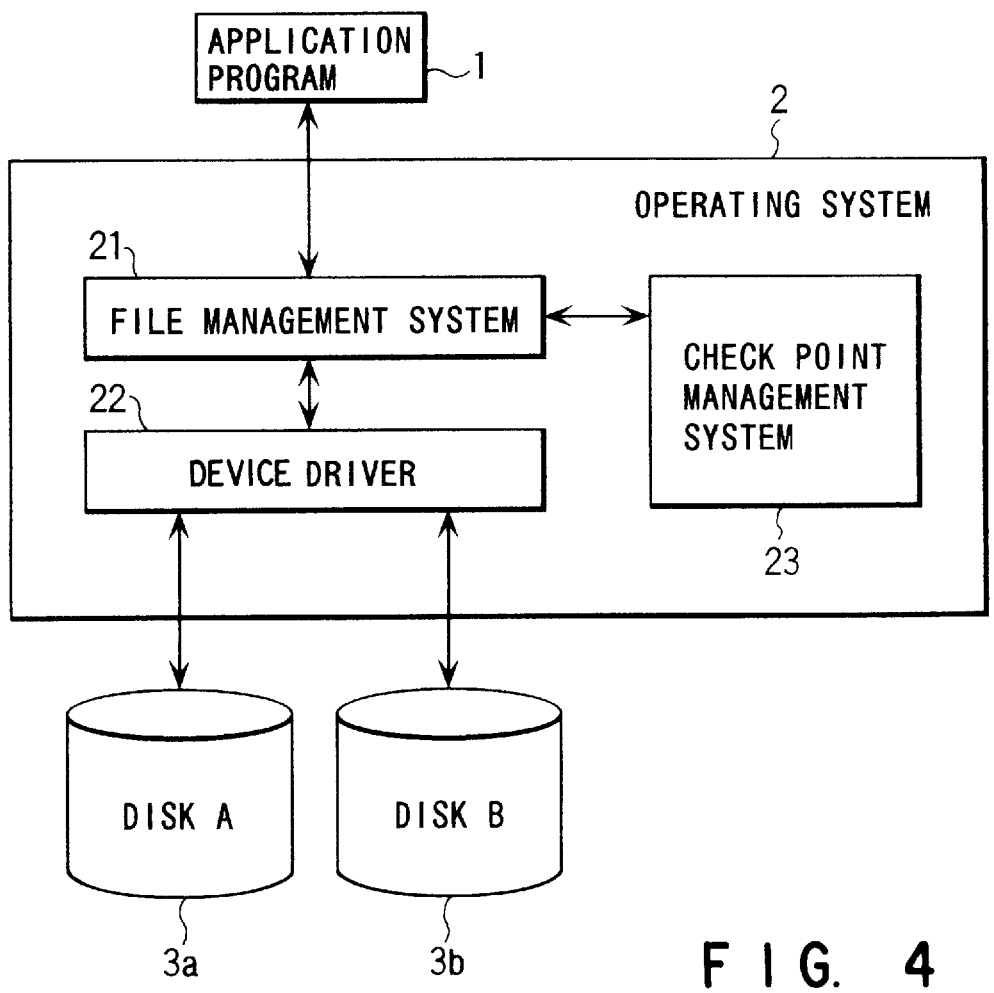
FIG. 4 is a function block diagram showing a schematic arrangement of the computer system according to first embodiment of the present invention.

FIG. 4 is a block diagram showing a schematic arrangement of the computer system according to the first embodiment of the present invention.

The computer system according to the present embodiment is wholly controlled by an operating system 2, and the operating system 2 is composed of a file management system 21, a device driver 22 and a check point management system 23.

The file management system 21 manages files held by disks 3a through 3b. The device driver 22 inputs/outputs data to the disks 3a through 3b. The check point management system 23 managing obtainment of check points.

In the computer system of the present embodiment, when an application system 1 issues a request to write data, this request of writing is sent to the file management system 21. The file management system 21 which receives the request of writing determines as to whether the data is multiplexed or not according to a location where the data are stored so as to determine the storage position. Here, the data are multiplexed by storing them to a disk 3a (primary) and a disk 3b (shadow).

Next, the file management system 21 gives an instruction to the device driver 22 so that the data are written to the primary disk 3a. The device driver 22 to which this instruction has been given executes the write process to the disk 3a.

In the most cases, check points are obtained during this execution, and the check points are informed from the check point management system 23 to the file management system 21.

When the device driver 22 completes the writing of the data to the disk 3a, the driver 22 informs the file management system 21 of the completion. The file management system 21, which received the information about obtaining of the check points from the check point management system 23, instructs to the device driver 22 to write data to the shadow disk 3a. Then, when the file management system 21 completes the write process to the shadow disk, the file management system 21 informs the application program 1 of completion of the write process.

Meanwhile, in the case of restarting the writing from the check points just before a defect, the file management system 21 instructs the device driver 22 to read out the data from the disk 3b, and the data of the shadow disk 3b recovers the data of the primary disk 3a.

The following describes a procedure of operation according to the present embodiment with reference to FIGS. 5A and 5B.

FIG. 5A is a flow chart showing the procedure of the normal operation.

The file management system 1, which receives the request of writing from the application program 1 (step A1), instructs the device driver 22 to write the data to the primary disk 3a, and the device driver 22 which received this instruction executes the writing to the disk 3a (step A2).

When the file management system 21 completes the write process (Y in step A3), the file management system 21 judges as to whether check points are obtained (step A4). When the check points are obtained (Y in step A4), the file management system 21 instructs the device driver 22 to write the data to the shadow disk 3b (step A5). When this write process is completed (Y in step A6), the file management system 21 informs the application program 1 of the completion of the write process (step A7).

FIG. 5B is a flow chart showing the procedure of operation in the case of restarting the writing from check points just before a defect.

In this case, the file management system 21 instructs the device driver 22 to read out the data from the disk 3b (step B1). When the data read process of the shadow disk 3b is completed (Y in step B2), the read-out data is rewritten to the primary disk 3a (steps B3 through B4). As a result, the data in the primary disk 3a are recovered.

Figure 6:
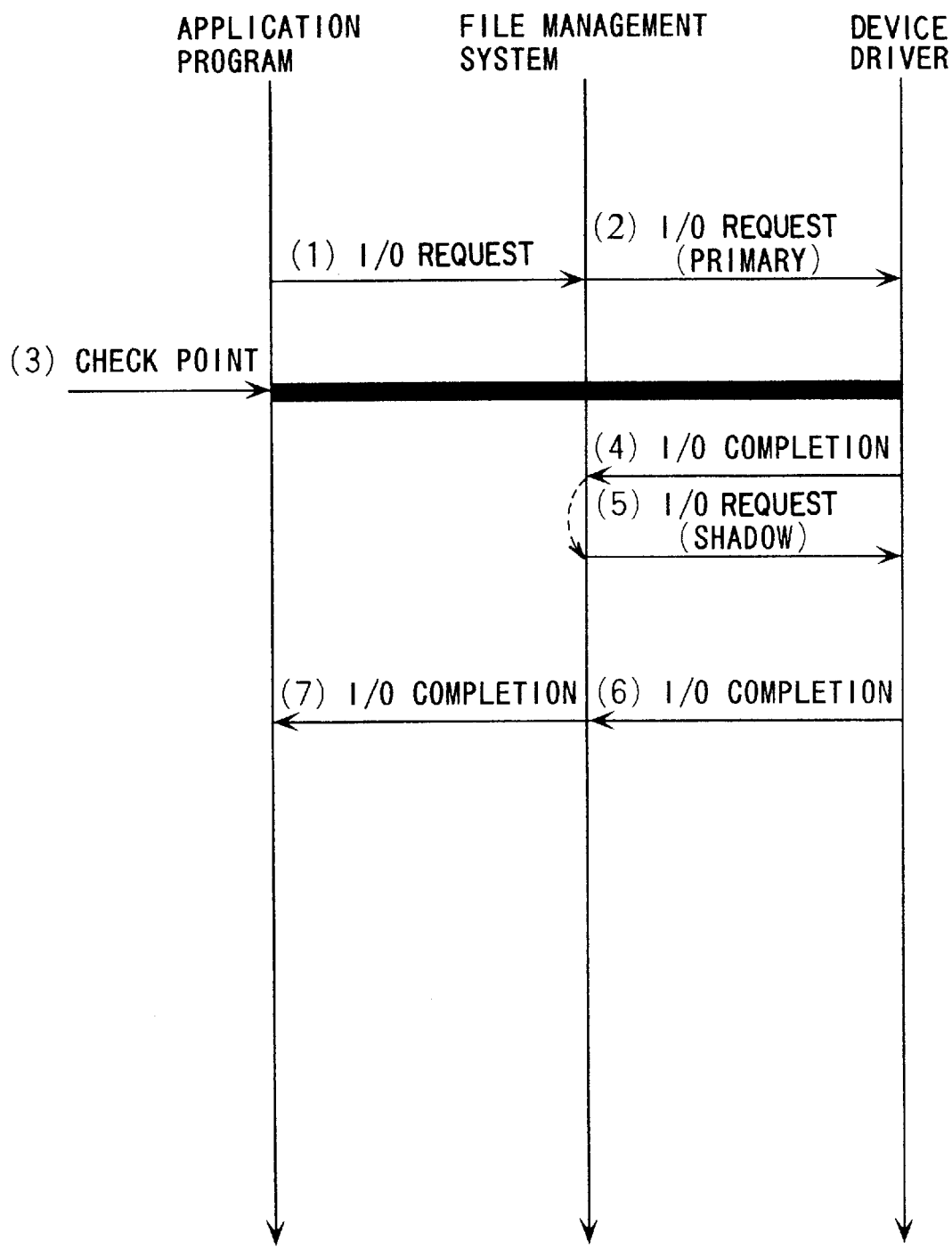
FIG. 6 is a view for explaining an operating principle of the computer system according to first embodiment.

FIG. 6 shows an operating principle according to the present embodiment.

For example, when a request of writing is issued from the application program ((1) in FIG. 6), the file management system does not wait for obtaining of next check point, and issues an instruction for writing to the primary file to the device driver ((2) in FIG. 6).

Since intervals of obtaining check points are enough small compared to a time required for a process of writing to the primary file, in most cases, next check point is obtained during the process of writing to the primary file ((3) in FIG. 6). When the completion of the writing is informed from the device driver ((4) in FIG. 6), the file management system issues an instruction to the device driver to write data to the shadow file ((5) in FIG. 6). When the completion of the writing to the shadow file is informed ((6) in FIG. 6), the file management system informs the application program of the completion of the writing ((7) in FIG. 6).

As a result, it can be prevented that the I/O process is waited until next check point is obtained. Moreover, when the data written to the primary file is recovered by the data in the shadow file, any mismatching does not occur.

SECOND EMBODIMENT

Figures 7A, 7B:
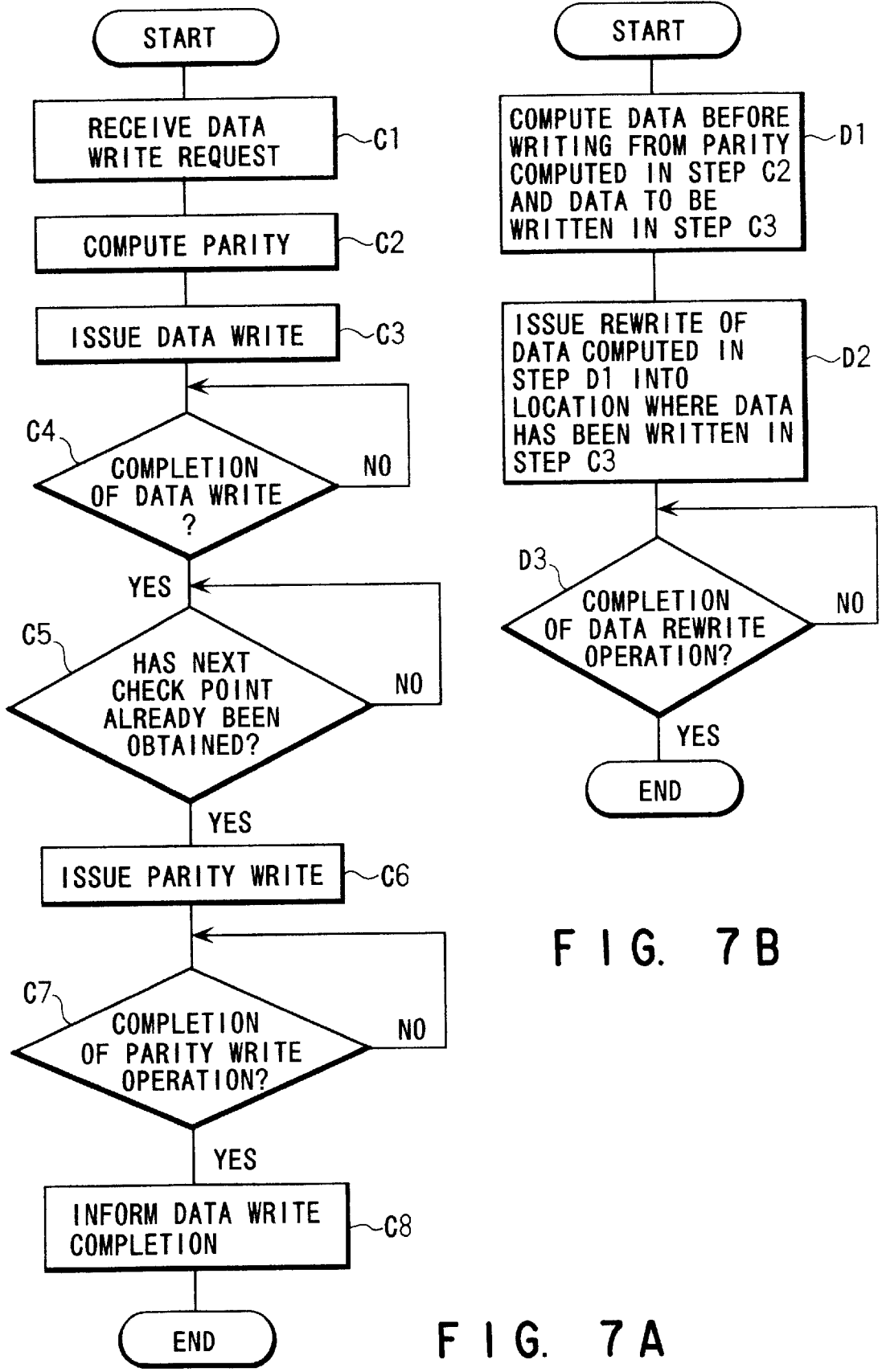
FIGS. 7A and 7B are flow charts explaining an operating procedure of a computer system according to second embodiment of the present invention.

The following describes the second embodiment of the present invention with reference to FIGS. 7A and 7B.

The arrangement of the present embodiment is the same as the first embodiment. However, in the first embodiment, primary and shadow files are provided so that the disk is multiplexed, thereby obtaining the reliability. On the contrary, in the present embodiment, reliability is realized by composing a parity group is composed by a plurality of disks 3a and 3b. More specifically, for example, on level 3 of RAID (Redundant Arrays of Inexpensive Disks) shown in FIG. 9A, input data are divided in bit unit, and are stored in a plurality of HDDs. Parity is used as an error correcting code. On level 5 shown in FIG. 9B, input data are interleaved in sector unit, and individual HDDs are respectively operated so as to process instructions of writing in parallel. Parity is dispersed into a plurality of HDDs.

The following describes a procedure of operation according to the present embodiment having the above arrangement on reference to FIG. 7A.

FIG. 7A is a flow chart showing the procedure of the normal operation.

When the file management system 21 receives a request of writing from the application program 1 (step C1), the file management system 21 computes a parity to be renewed after the writing of the data through a known method (step C2). Then, the file management system 21 instructs the device driver 22 to write the data, and the device driver 22 which received the instruction executes the write process (step C3).

When the write process is completed (Y in step C4), the file management system 21 determines as to whether check points have been obtained (step C5). When the check points have been obtained (Y in step C5), the file management system 21 instructs the device driver 22 to write the parity (step C6). When the write process is completed (Y in step C7), the file management system 21 informs the application program 1 of the completion of the write process (step C8).

FIG. 7B is a flow chart showing a procedure of an operation in the case of restarting the writing from a check point just before a defect.

In this case, the file management system 21 computes data before writing based upon the parity computed in the step C2 and the data written in C3 through a known method (step D1). Then, the calculated data are rewritten to the location where the writing is executed in step C2 (steps D2 and D3) so that the data are recovered.

As a result, similarly to the first embodiment, it can be avoided that the I/O process is waited until next check point is obtained. Moreover, since the data are recovered by the parity, any mismatching does not occur.

The same effect can be obtained even if the writing of data and the writing of parity are reversed.

Figures 8A, 8B:
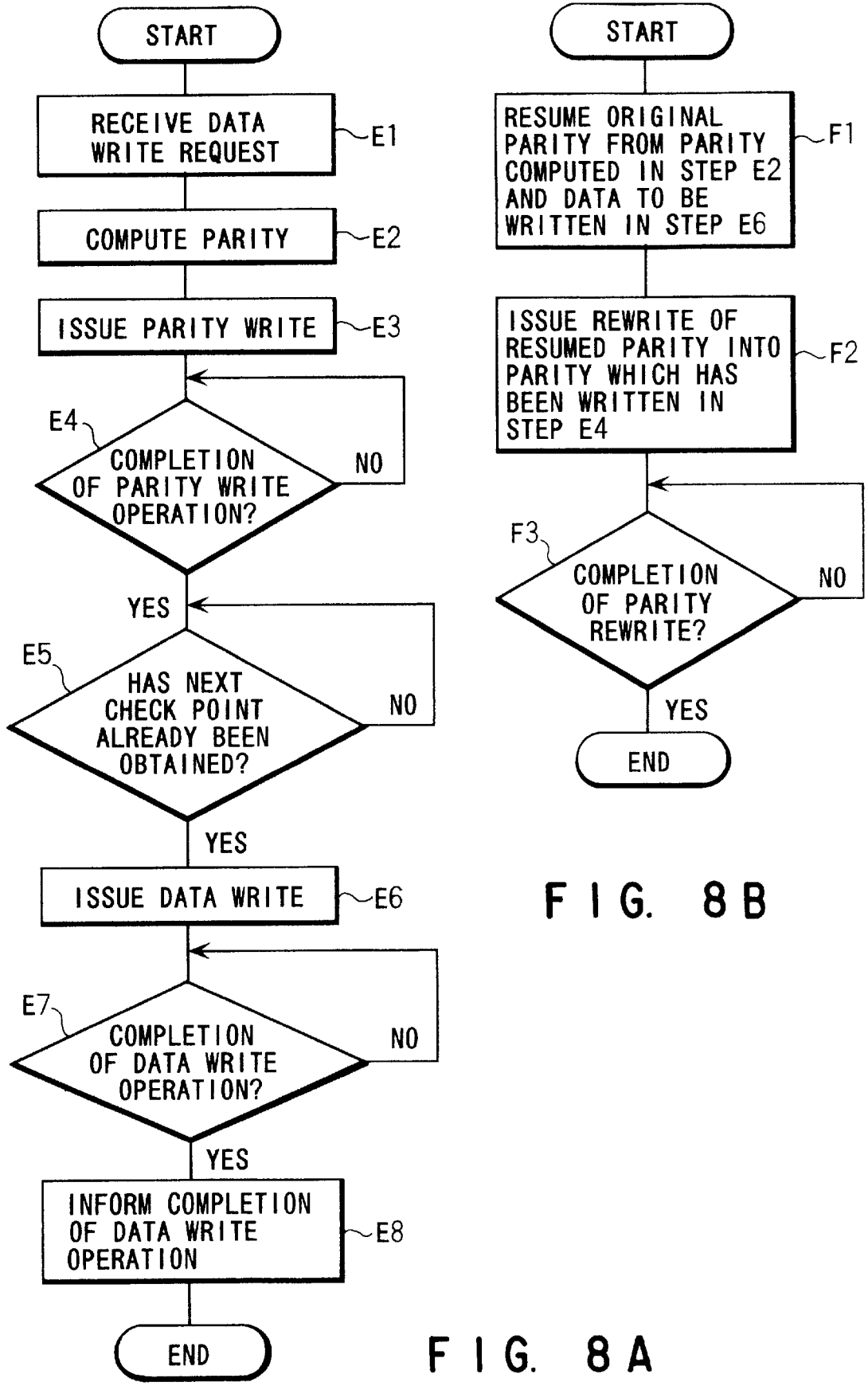
FIGS. 8A and 8B are flow charts explaining an operating procedure of the computer system according to second embodiment.

Namely, as shown in FIG. 8A, in the case where the data write process is executed after the write process of parity is completed (on condition that next check point has been obtained), as shown in FIG. 8B, when restarting from preceding check point, an original parity is recovered by a known method (step F1) based upon the parity computed by the known method in step E2 and the data written in step E6, and the parity written in step E4 is replaced by the recovered parity (steps F2 and F3) so that the data can be recovered.

In addition, in the aforementioned embodiments, timing of writing to the primary and shadow files and the timing of writing the data and parity are controlled by the file management system, for example, but they can be also controlled on the device driver side.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An I/O control method to be applied to a computer system for multiplexing and managing single data in a plurality of locations, said computer system comprising check point obtaining means for periodically obtaining check points for restarting an interrupted process when the process is interrupted, said I/O control method comprising the computer-implemented steps of:

determining a plurality of locations in a secondary storage unit as writing locations for the data when a request to write the data to the secondary storage unit is received;

issuing the received data write request to at least one or more location in said determined plurality of locations in the secondary storage unit without waiting for a next check point;

executing the data write process to the locations other than the locations where the data write process has been executed in said step of issuing the received request after a next check point is obtained; and recovering data in the locations where the data write process has been executed in said step of issuing the received request by the data in the other locations when the process is restarting from an obtained preceding check point after the process is interrupted due to a system malfunction.

2. An I/O control method to be applied to a computer system for composing a parity group and managing single data in a plurality of secondary storage units, said computer system comprising check point obtaining means for periodically obtaining check points for restarting an interrupted process when the process is interrupted, said I/O control method comprising the computer-implemented steps of:

computing a parity after data renewal of the secondary storage units when a request to write data to the secondary storage units is received;

issuing the data write request to the secondary storage units without waiting for a next check point;

issuing a write request of the parity calculated in said computing step after obtaining a next check point; and recovering the data written in said step of issuing the data write request by data computed from the parity when restarting the process from an obtained preceding check point after the process is interrupted due to a system malfunction.

3. An I/O control method to be applied to a computer system for composing a parity group and managing information in a plurality of secondary storage units, said computer system comprising check point obtaining means for periodically obtaining check points for restarting an interrupted process when the process is interrupted, said I/O control method comprising the computer-implemented steps of:

computing a parity after data renewal of the secondary storage units when a data write request to the secondary storage units is received;

issuing a write request of the parity computed in said computing step without waiting for a next check point;

issuing a data write request to the secondary storage units after obtaining a next check point; and recovering the parity written in said step of issuing the data write request by a parity computed from the data in the secondary storage units when restarting the process from an obtained preceding check point after the process is interrupted due to a system malfunction.

4. An article of manufacture comprising:

a computer usable medium having computer readable program code means embodied therein for causing a computer system to obtain check points periodically for restarting an interrupted process, the computer system copying and managing single data at a plurality of locations, the computer readable program code means in said article of manufacture comprising:

computer readable program code means for causing a computer to assign a plurality of locations in a secondary storage unit, upon receiving a data write request to the secondary storage unit;

computer readable program code means for causing a computer to issue, without waiting for a next check point, the received data write request to at least one or more locations of the assigned locations in the secondary storage unit;

computer readable program code means for causing a computer to issue, after obtaining a next check point, the received data write request to the remaining locations of the assigned locations in the secondary storage unit; and computer readable program code means for causing a computer to recover data in the at least one or more locations with the data of the remaining locations, upon restarting from an obtained preceding check point after the process is interrupted due to a system malfunction.

5. An article of manufacture comprising:

a computer usable medium having computer readable program code means embodied therein for causing a computer system to obtain check points periodically for restarting an interrupted process, the computer system constituting a parity group in a plurality of secondary storage units thereby managing data, the computer readable program code means in said article of manufacture comprising:

computer readable program code means for causing a computer to compute parity after updating data in the secondary storage units, upon receiving a data write request to the secondary storage units;

computer readable program code means for causing a computer to issue, without waiting for a next check point, a data write request to the secondary storage units;

computer readable program code means for causing a computer to issue, after obtaining a next check point, a write request of the computed parity data; and computer readable program code means for causing a computer to recover the data written with data computed from the parity data upon restarting from an obtained preceding check point after the process is interrupted due to a system malfunction.

6. An article of manufacture comprising:

a computer usable medium having computer readable program code means embodied therein for causing a computer system to obtain check points periodically for restarting an interrupted process, the computer system constituting a parity group in a plurality of secondary storage units thereby managing data, the computer readable program code means in said article of manufacture comprising:

computer readable program code means for causing a computer to compute parity after updating data, upon receiving a data write request to the secondary storage units;

computer readable program code means for causing a computer to issue, without waiting for a next check point, a parity write request to the secondary storage units;

computer readable program code means for causing a computer to issue, after obtaining a next check point, a data write request to the secondary storage units; and computer readable program code units for causing a computer to recover the parity written without waiting for the next check point with parity computed from the data within the secondary storage units upon restarting from an obtained preceding check point after the process is interrupted due to a system malfunction.

\* \* \* \* \*